Aug. 17, 1937.  O. P. WILLIAMS  2,090,277
ADJUSTABLE ORIFICE AND VALVE
Filed May 27, 1932
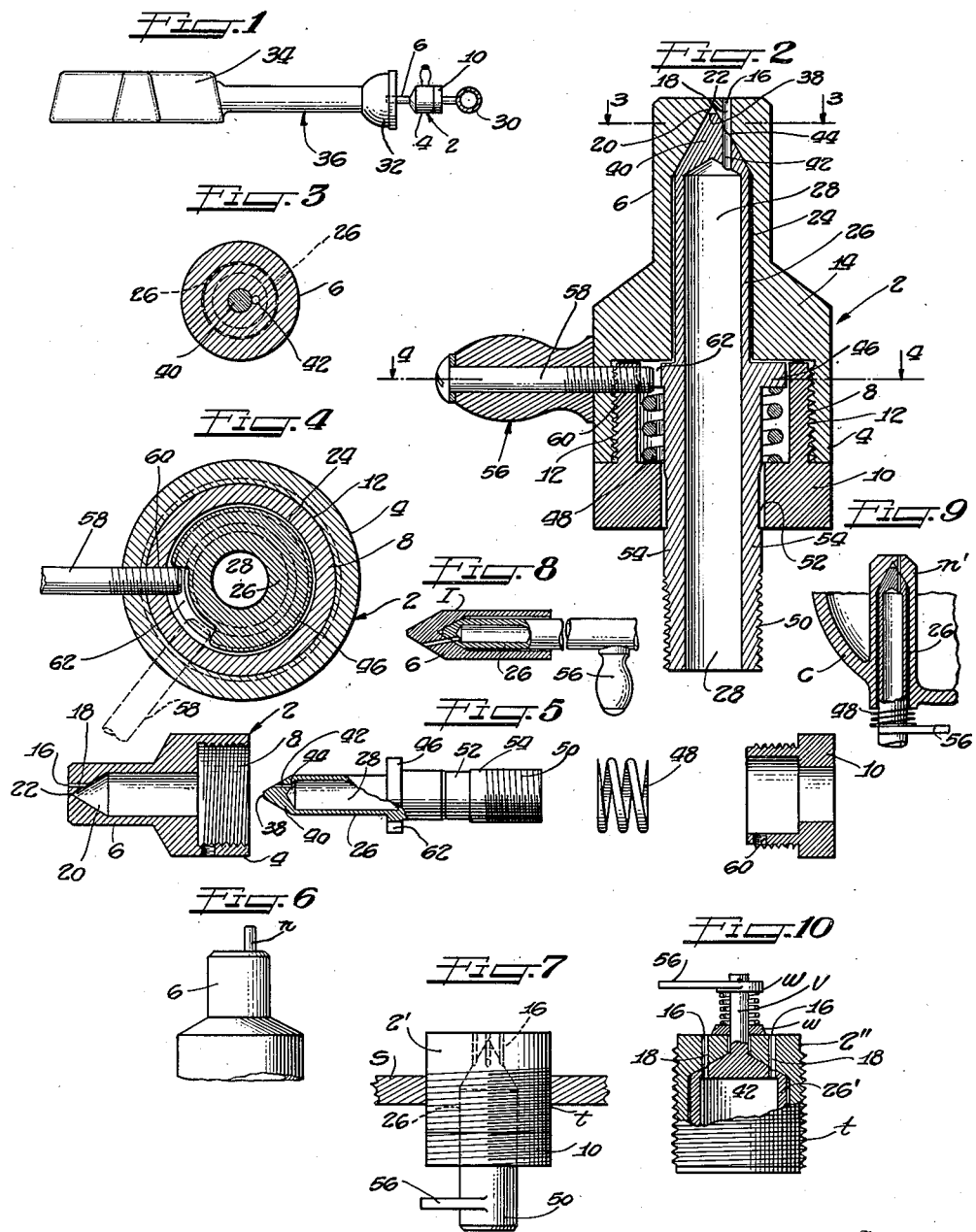
Inventor
O. P. Williams.
By Fred H Hayn
Attorney

Patented Aug. 17, 1937

2,090,277

UNITED STATES PATENT OFFICE 2,090,277

ADJUSTABLE ORIFICE AND VALVE

Ormsby P. Williams, South Gate, Calif.

Application May 27, 1932, Serial No. 613,816

4 Claims. (Cl. 251—9)

My invention relates to valve constructions, adapted for a variety of uses, such as a gas flow regulating means for gas ranges, fluid pressure guns, welding tools, the control of fuel in carbureters, fluid pressure regulators and the like, in which it is desirable that an accurate control for the fluid be had, effectively preventing any clogging due to impurities in the fluid or fuel used, and also providing for compensating for wear of the parts while in use.

It accordingly is an object of my invention to provide a novel form of adjustable orifice and valve comprising a suitable casing or housing, provided with one or more discharge orifices, preferably positioned in offset relation with said casing or housing, a rotatable hollow valve being operable in said casing, or housing, which valve has a blunt tapered end portion provided with a passage adapted to be brought into alignment with said discharge orifices, said end of said valve being complementary to a similarly tapered but pointed portion in said casing, for the purpose of compensating for wear, means, either internally or externally of said casing being provided to hold said valve to its seat, and any suitable means, associated as preferred with said valve, for rotating the same.

It is also within the province of my invention to rotate the casing rather than the valve, which valve is stationary, and may in practice be associated with any support or fluid or fuel source desired.

The above and further objects and advantages of my invention, as will hereinafter more fully appear, I attain by the construction described in the specification and illustrated on the drawing, forming a part of my application.

Reference is had to the accompanying drawing, in which similar reference characters denote similar parts. In the drawing, Fig. 1 is a fragmentary elevational view, showing the application of my invention to a gas range, Fig. 2 is an enlarged cross-sectional view of one form of my invention, removed from any structure with which it is adapted to be associated, Fig. 3 is a transverse cross-sectional view, taken on the line 3—3, Fig. 2, looking in the direction of the arrows, Fig. 4 is a similar view, taken on the line 4—4, Fig. 2, also looking in the direction of the arrows, Fig. 5 is an exploded view of the parts shown in composite structure, depicted in Fig. 2, parts being in elevation and cross-section, and broken away to disclose the internal construction, Fig. 6 is a fragmentary elevational view, showing a slight modification, the device being more particularly adapted for use in connection with a pressure gun, Fig. 7 is a part sectional and part elevational view of another modification where a plurality of orifices are used, Fig. 8 is a fragmentary cross-sectional view, showing my invention applied to a welding tool or soldering iron, Fig. 9 is a similar view illustrating the application of my invention to a carbureter, and Fig. 10 is a similar view illustrating still another modification, in which the invention is applied to a fluid pressure regulator.

Describing my invention more in detail, which invention has a variety of uses, the broad features thereof being shown more particularly in Figs. 2–5 inclusive, it being understood that the broad valve control structure is identical in all forms, the positioning of the various parts thereof, however, being susceptible of change, as more particularly indicated in the other views of the drawing.

More specifically, my invention comprises a suitable housing or casing 2, preferably having an enlarged portion 4, and a reduced extension 6, which are bored, cut, or formed in practice in any manner found desirable, said enlarged portion 4 having a hollow portion 8, which may be screw-threaded as shown to receive a closure or plug 10, having a reduced and threaded extension 12, to close the end of said hollow portion 8. It will, of course, be understood that the casing 2 may be closed in any other manner and means in practice desired or needed.

The other end of the casing or housing 2 may have a thickened and outwardly tapered portion 14, from which projects the extension 6, both said thickened portion and said extension being hollow, and preferably bored on the same axis as that of the hollow portion 8.

The extension 6 is provided with one or more orifices 16, preferably positioned in offset relation with the axis of the casing 2, and in communication with the passage 18 through which the fluid is adapted to be discharged. Said extension has a tapered bored portion 20 (Figs. 2 and 5), terminating in a point 22, to provide a wear compensating means, presently to be more particularly described, said extension 6 being also provided with a bored portion 24, preferably in axial alignment with the casing 2, but of smaller diametrical cross-section than the hollow portion 12.

Operable within the portions 24 and 8 is a preferably elongated, hollow valve structure 26, the hollow part being indicated by the reference numeral 28, said hollow part being adapted to be connected, as in practice preferred, to a fluid conduit 30, such as shown in Fig. 1, where the device projects within the air inlet portion 32 connected to the burner of the gas range 36.

The other end of the valve 26 is preferably solid and externally tapered in a manner complementary to the taper 20 of the housing 2, but blunt as indicated at 38, (Figs. 2 and 5), rather than pointed as is the case with the tapered portion 20 at 22, the purpose being as the valve and its seat, which as the portion 20 wears, said wear is compensated for by the further projection of the tapered portion 40 of the valve 26 into the tapered portion or valve seat 20.

The tapered portion or head 40 of the valve 26 is provided with a fluid passage 42, having an orifice 44, which, when the casing 2 is rotated, is placed in communication with the hollow portion 28 of said valve, and the passages 18 and orifices 16. The passages 18 and 42 open through the tapered surfaces of their respective members, and the members are in fluid-tight contact at the zones which include the openings to the passages.

The valve 26 may be provided with a flange 46, slightly spaced from the thickened portion 14 in the hollow portion 8, and between said flange and the inner portion of the closure 10, a resilient means, such as the spring 48 is positioned, the purpose of which is to hold the valve 26 to its seat, the plug 10, if desired, also serving to adjust the tension of said spring. The valve 26 may be provided with an externally threaded extension 50, whereby the assembly 2 may be associated with any supporting structure in practice preferred, that shown in Fig. 1 being the gas pipe 30.

If desired the stationary valve 26 may be provided with a suitable cut-away portion 52 to define an implement engaging projection 54, whereby the assembly 2 may be screwed home upon the pipe 30, or any other supporting structure in practice preferred.

Any preferred means for operating the rotary casing 2 to control the flow of fluid by the valve 56 may be provided, but in the present instance I have shown a suitable handle construction 56, which may include a screw bolt 58, the inner end of which is screwed into a hole 60 in the closure 10, said inner end being adapted to project into an arcuate cut-away portion 62 (Fig. 4, more particularly), which may be of any preferred length and cut from the flange 46, so the orifice 16 and passage 18 may be placed in alignment with the passage 42 of the stationary valve 26.

It will, of course, be understood that any preferred number of orifices 16 may be provided, and the valve with a set of complementary passages. Moreover, the casing may be stationary and the valve itself rotated, to bring said passages and orifices in alignment.

It will be noted that, when the valve members are turned relatively into the position shown in Fig. 2, the passages 18 and 42 register and form a continuous and straight-line passage for the fluid, such passage being eccentric to the common axis of the members and extending parallel to said axis. The passage is small as compared with the bore 28 of the inner member so that the fluid is discharged under pressure in a relatively fine stream or streams in the direction of the axis and into the pipe connection 36 leading to the burner or other structure wherein the fluid is utilized, the combined lengths of the passages 18 and 42 being sufficient to give direction to said stream.

Such a construction is shown in Fig. 7, in which the casing 2' is stationary and may be associated in any preferred manner with a support S, as by the threads t, the valve 26 except as just described, being identical with the other form of my invention, the handle 56 being used to operate the rotary valve 26 by rotating its fluid inlet extension 50.

In Fig. 6 I have shown another slight modification in which a suitable nozzle n is associated with the extension 6, said construction being especially useful in connection with a fluid pressure gun, said nozzle n effectively directing the fluid used to the work, the construction being otherwise the same as the other form of my invention, as indicated by the reference numerals.

In Fig. 8 I have shown a modification, in which the operating valve 56 is rotary, as that shown in Fig. 7, but the invention is shown as applied to a welding tool or soldering iron I, the construction being otherwise the same as indicated by the similar reference numerals.

My invention is also useful in controlling the flow of fuel in carbureters, such an application being depicted in Fig. 9 in which the fuel nozzle n' of the carbureter c is equipped with the rotary valve 26, the remaining construction being identical with that previously described, as also indicated by similar reference numerals.

In Fig. 10 I have shown a construction adapted for use in connection with fluid pressure regulators, in which the casing 2'' is stationary and may be secured to a suitable support (not shown) by means of the threads t. In this modification the valve 26' is rotary, but of a somewhat different construction, said valve having a stem v, operable by a handle 56, said stem being adapted to abut against the washers w, associated with said stem as shown, the rest of the construction being similar to that previously described.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. A valve structure comprising an inner valve member, said member being a hollow cylinder with one end closed except for a fluid passage therethrough, said passage being eccentrically positioned with respect to the axis of the member, an exterior circumferential flange extending about said member, an outer valve member having an axial bore into which the inner member projects, said outer member having a closed end covering and having a fluid-tight contact with the closed end of the inner member, the closed end of the outer member having a fluid passage eccentrically positioned with respect to the axis of the member, means through which a relative rotary movement may be produced between said members to bring the passages therein into alinement, a closure element for that end of the outer member which is opposite the end having the passage, said element loosely surrounding the inner member and forming therewith and with the said circumferential flange an annular chamber, and a spring in said chamber bearing upon the closure and the flange for forcing the valve members together at their closed ends.

2. A structure as set forth in claim 1 in which the closure element and the outer valve member are screw-threaded together whereby the element may be adjusted in position to regulate the tension of said spring.

3. A structure as set forth in claim 1 in which the circumferential flange on the inner member is provided with an arcuate notch in its perimeter and the outer element has a part rigidly connected therewith which projects into said arcuate notch whereby limiting stops are provided for the rotatory movement between the valve members.

4. A structure as set forth in claim 1 in which the circumferential flange on the inner member is provided with an arcuate notch in its perimeter, and a handle means removably secured to the outer valve member and projected into the said notch, whereby the handle means serves for rotating the outer member and, by its engagement with the flange at the ends of the notch, for limiting the rotatory movement of the outer member.

ORMSBY P. WILLIAMS.